(12) United States Patent
Kim et al.

(10) Patent No.: US 7,428,018 B2
(45) Date of Patent: Sep. 23, 2008

(54) APPARATUS AND METHOD FOR ADJUSTING SCREEN

(75) Inventors: Dae-jung Kim, Gyeonggi-do (KR); Seung-cheol Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 556 days.

(21) Appl. No.: 10/703,080

(22) Filed: Nov. 7, 2003

(65) Prior Publication Data

US 2004/0165113 A1 Aug. 26, 2004

(30) Foreign Application Priority Data

Nov. 7, 2002 (KR) ...................... 10-2002-0068762

(51) Int. Cl.
*H04N 9/74* (2006.01)

(52) U.S. Cl. ...................................... 348/564

(58) Field of Classification Search ......... 348/563–569, 348/588, 589; 345/589, 619, 1.1
See application file for complete search history.

(56) References Cited

U.S. PATENT DOCUMENTS

| 6,683,616 | B1 * | 1/2004 | Yamauchi et al. ............ 345/589 |
| 6,791,624 | B1 * | 9/2004 | Suga ............................. 348/58 |
| 2004/0090391 | A1 * | 5/2004 | Kondo ......................... 345/1.1 |
| 2006/0129933 | A1 * | 6/2006 | Land et al. ................... 715/723 |

* cited by examiner

*Primary Examiner*—Paulos M Natnael
(74) *Attorney, Agent, or Firm*—Staas & Halsey LLP

(57) ABSTRACT

A method and apparatus for adjusting a screen. The apparatus for adjusting a screen includes an on screen display (OSD) adjusting unit and a screen dividing unit. The OSD adjusting unit is overlaid on a reproduced image for providing an interface to allow screen adjustment by a user. The screen dividing unit displays an area of the screen based on the adjusted screen state using the OSD adjusting unit, while keeping the other area of the screen intact.

27 Claims, 4 Drawing Sheets

APPARATUS AND METHOD FOR ADJUSTING SCREEN

CROSS-REFERENCE TO RELATED APPLICATIONS

This application claims the benefit of Korean Patent Application No. 2002-68762, filed Nov. 7, 2002, in the Korean Intellectual Property Office, the disclosure of which is incorporated herein by reference.

BACKGROUND OF THE INVENTION

1. Field of the Invention

The present invention relates to screen adjustment of an image display device, and more particularly, to an apparatus and method for adjusting a screen, by which a user can adjust the screen while visually confirming changes in the screen.

2. Description of the Related Art

Image display devices such as TV sets allow users to adjust the screen with an on screen display (OSD). FIG. 1 illustrates an OSD that is displayed on the screen and allows for screen adjustment.

As shown in FIG. 1, a user can easily adjust the screen, using the OSD of the display device even when the image being displayed has been received through a tuner or reproduced from a storage medium. However, when using conventional image display devices, the user cannot compare two states of the screen at the same time. The user must compare the screens by switching back and forth between settings. In an attempt to solve this problem, the technology of FIG. 2 has been used.

FIG. 2 is a schematic block diagram illustrating an image display device which allows the user to compare the state of the screen before and after screen adjustment. The image display device includes a first tuner 200, a second tuner 210, a first image processor 220, a second image processor 230, a picture in picture (PIP) processor 240, a color signal processor 250, an OSD processor 260, an image superposition processor 270, and a MICOM 280. The first tuner 200 tunes in a signal from among broadcast signals received through an antenna, and separately outputs audio and image signals. The second tuner 210 tunes in a signal from among broadcast signals received through the antenna, and separately outputs audio and image signals. The first image processor 220 adjusts the image output from the first tuner 200 for display. The second image processor 230 adjusts the image output from the second tuner 210 for display. The PIP processor 240 outputs a display that includes the images received from the first image processor 220 and the second image processor 230 to a PIP screen. The color signal processor 250 receives the images from the PIP processor 240 and the first tuner 200, and outputs them as brightness and chroma signals. The OSD processor 260 provides the user with a screen adjustment menu in an OSD. The image superposition processor 270 superposes the OSD menu output from the OSD processor 260, and the brightness and chroma signals output from the color signal processor 250, and then outputs the superposed image. The MICOM 280 controls each part of the image display device of FIG. 2 and drives the PIP processor 240 upon receipt of a screen adjustment signal.

According to a configuration of FIG. 2, when the user performs a screen adjustment using the OSD menu, two frames having the same image, but in different states, are simultaneously displayed in the PIP screen. FIG. 3 illustrates the screen during adjustment using the image display device of FIG. 2.

The configuration of FIG. 2 allows a user to compare two different states of the screen, before and after screen adjustment, by simultaneously displaying two frames with the same image, but having different states, on the screen in a PIP screen. However, as shown in FIG. 3, because two frames having the same image are simultaneously displayed on the screen in the PIP, the user may feel inconvenienced or confused by the complexity of the PIP screen when the same image is reproduced on the screen in two different frames. In other words, screen adjustment according to the related art may interfere with a user's appreciation of a reproduced image.

SUMMARY OF THE INVENTION

The present invention provides an apparatus and method for adjusting a screen, by which users can compare the state of the screen before screen adjustment with the state of the screen after screen adjustment, without interference of the appreciation of a reproduced image.

According to an aspect of the present invention, there is an apparatus for adjusting a screen having an OSD adjusting unit overlaid on an image to provide an interface that allows screen adjustment by a user. The apparatus according to this aspect of the present invention also has a screen dividing unit to display an area of the screen, based on the adjusted screen state, using the OSD adjusting unit, while keeping the other area of the screen intact.

An additional aspect further comprises a memory which stores a plurality of screen adjustment parameters corresponding to various screen adjustment states, so that the screen dividing unit can display the applied screen adjustment state together with the reference screen state.

The OSD adjusting unit shows selectable screen adjustment states such as a first screen adjustment state and a second screen adjustment state, to the user. The memory stores the screen adjustment parameters corresponding to each screen adjustment state.

When the user selects one of the screen adjustment states through the OSD adjusting unit, a screen adjustment parameter corresponding to the selected screen adjustment state is provided to the screen dividing unit from the memory. The screen dividing unit then changes the screen state of a predetermined area of the screen based on the screen adjustment parameter while the screen state of the remainder of the screen remains unchanged.

According to another aspect of the present invention, there is an apparatus for adjusting a screen that comprises an image receiving unit, which receives an image to be reproduced. The apparatus also has a scaler which converts the format of the image received from the image receiving unit into a format suitable for a display panel, and a screen dividing unit. The screen dividing unit, when in a screen adjustment mode, divides the screen, including the image having the converted format, into two areas, one of which is displayed in a first screen state and the other of which is displayed in a second screen state on the display panel. An OSD adjusting unit provides an OSD menu as an interface on the display panel to a user to allow screen adjustment by the user. A control unit controls the screen dividing unit such that the screen dividing unit divides the screen, including the image having the converted format, into two areas, one of which is displayed as a first screen state and the other of which is displayed as a second screen state on the display panel when the user selects a screen adjustment mode through the OSD adjusting unit.

The first screen state is a predetermined reference screen state, and the second screen state is a screen adjustment state selected by the user through the OSD adjusting unit.

The OSD adjusting unit provides a user with a plurality of screen adjustment states such as a first screen adjustment state and a second screen adjustment state.

According to yet another aspect of the present invention, there is an apparatus for adjusting a screen that comprises: an image receiving unit which receives an image to be reproduced; a scaler which converts a format of the image received from the image receiving unit into a format suitable for a display panel; a screen dividing unit which, in a screen adjustment mode, divides the screen, including the image having the converted format, into two areas, one of which is displayed in a first screen state and the other of which is displayed in a second screen state on the display panel; a memory which stores a plurality of screen adjustment parameters; an OSD adjusting unit which displays an OSD menu as an interface on the display panel to allow screen adjustment by the user; and a control unit which, when the user selects a screen adjustment mode through the OSD adjusting unit, uses the memory to provide the screen dividing unit with the screen adjustment parameter corresponding to the selected screen adjustment mode, and controls the screen dividing unit such that the screen dividing unit divides the screen, including the image having the converted format, into two areas, one of which is displayed as a first screen state and the other of which is displayed as a second screen state.

In an aspect of the present invention, the first screen state is a reference screen state, and the second screen state is a screen adjustment state selected by the user through the OSD adjusting unit.

The OSD adjusting unit provides a user with a plurality of screen adjustment states such as a first screen adjustment state and a second screen adjustment state. The memory stores a plurality of screen adjustment parameters that correspond to the screen adjustment states.

When a user selects a screen adjustment state through the OSD provided by the OSD adjusting unit, the control unit controls the memory such that the memory provides the screen adjustment parameters corresponding to the selected screen adjustment state to the screen dividing unit. The screen dividing unit then changes the screen state of a predetermined area of the screen based on the screen adjustment parameters. The remaining area of the screen stays in the reference screen state.

When two states of the screen are displayed on the display panel and the user selects one of the two screen states through the OSD menu, the control unit controls the entire area of the screen to be displayed in the selected screen state.

According to another aspect of the present invention, there is a method of adjusting a screen used in a device which displays an image on a display panel. The method comprises receiving an image to be displayed, providing a screen adjustment mode to a user, allowing the user to adjust the screen dividing the screen into two areas, and displaying a part of the screen in a screen adjustment state and the other part of the screen in a reference screen state.

Providing the screen adjustment mode to the user is characterized by showing a plurality of selectable screen adjustment states, such as a first screen adjustment state and a second screen adjustment state, on an OSD menu on a display panel, so as to allow the user to easily select one of the plurality of the screen adjustment states.

The operation of adjusting of the screen by the user is characterized by the user selecting one of the plurality of the screen adjustment states.

According to another aspect of the present invention, there is a method of adjusting a screen used in a device reproducing an image comprising: receiving an image to be reproduced; selecting the image by converting the format of the image into a format suitable for a display panel; allowing a user to select a screen adjustment mode provided by an OSD menu; displaying a part of the screen in a reference screen state and the other part of the screen in a screen adjustment state; allowing the user to select either the reference screen state or the screen adjustment state through the OSD menu; and displaying the entire area of the screen in the selected screen state.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
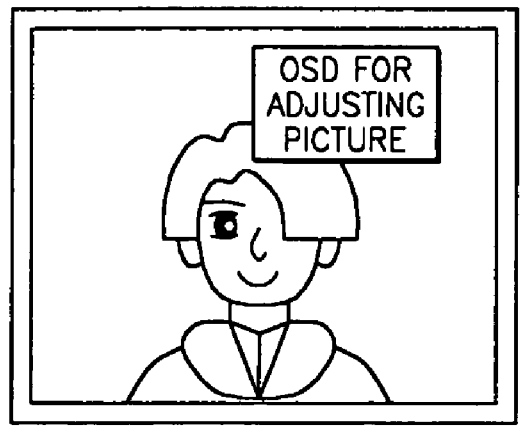
FIG. 1 illustrates an example of a screen with an on screen display (OSD) for allowing screen adjustment, according to the related art.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 4:
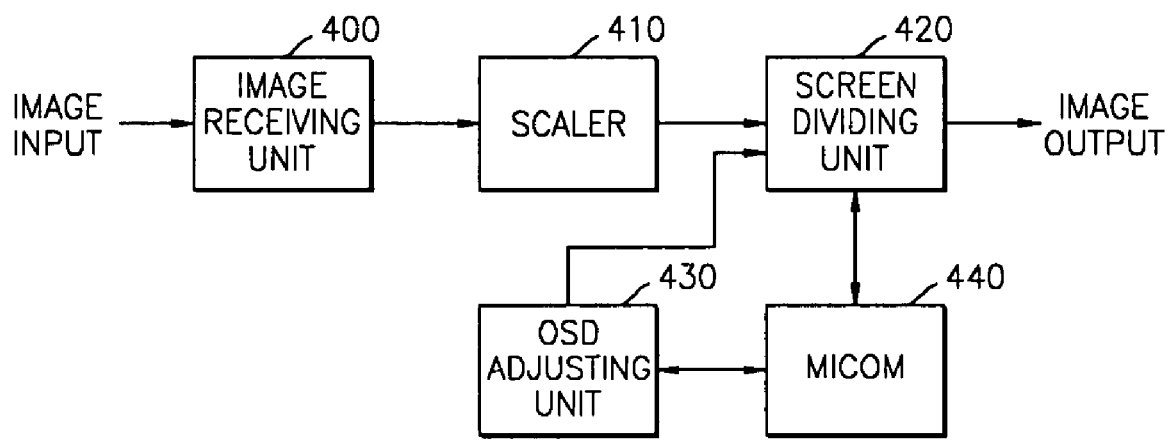
FIG. 4 illustrates an apparatus for adjusting a screen according to an embodiment of the present invention.

FIG. 4 illustrates an apparatus for adjusting a screen according to an embodiment of the present invention.

The apparatus for adjusting the screen includes an image receiving unit 400, a scaler 410, a screen dividing unit 420, an OSD adjusting unit 430, and a MICOM 440.

The image receiving unit 400 tunes in a broadcast from among various broadcast signals received through an antenna or other signal input device, (not shown), and outputs image signals of the broadcast signal to the scalar 410. The image receiving unit 400 may also receive the broadcast signals, and output the image signals of the broadcast signals, through a tuner or a video terminal.

The scaler 410 receives the image signals for TV display from the image receiving unit 400 and converts the format of the received image signals into one suitable for TV display.

The screen dividing unit 420 sets the screen area to be adjusted while displaying the image output from the scaler

410. Thus, a certain area of the screen is displayed on the display panel in a first screen state, and another area of the screen is displayed in a second screen state.

The OSD adjusting unit 430 provides an interface, i.e., an OSD menu that allows a user to adjust the state of the screen that is displayed on the display panel. The OSD menu can be overlaid on an existing image in the display panel. Once the user manipulates the display panel to operate the OSD adjusting unit 430, the OSD menu is displayed on the display panel. The user can adjust the screen by changing any of a plurality of screen state factors (brightness, contrast, etc.) presented in the OSD menu. Alternatively, the OSD adjusting unit 430 provides the user with screen state information such as the first screen state and the second screen state, in which the screen state factors are predetermined, and allows the user to select one of the predetermined screen states.

Once the screen adjustment is performed by the OSD adjusting unit 430, the MICOM 440 controls the screen dividing unit 420 such that the screen dividing unit 420 divides the screen into two areas and changes the screen state of one area of the screen by applying the user's screen adjustment thereto. The other area of the screen remains unchanged.

Figure 5:
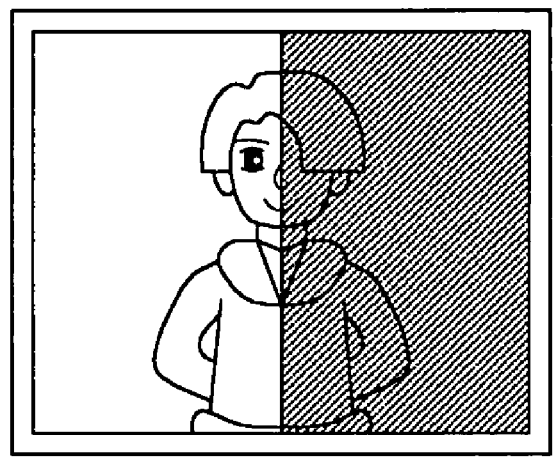
FIG. 5 illustrates a screen when a user is adjusting a screen by using the apparatus for adjusting the screen of FIG. 4.

FIG. 5 illustrates the screen of an image displayed with two different screen adjustment states using the apparatus of FIG. 4. A first area of the image (on the left side of the screen in FIG. 5) is displayed with a reference screen state predetermined by the apparatus for adjusting the screen of FIG. 4. A second area of the image (on the right side of the screen in FIG. 5) is displayed with the screen state after adjustment.

Figure 6:
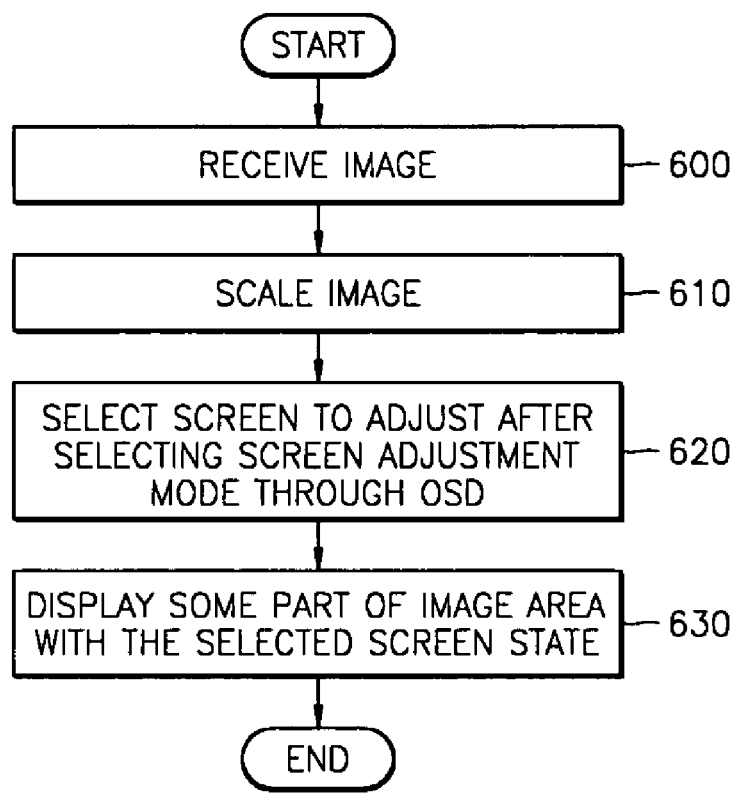
FIG. 6 is a flowchart of a method of adjusting a screen according to the present invention.

FIG. 6 is a flowchart of a method of adjusting a screen according to the present invention.

In the first operation 600, an image to be displayed is input to the image receiving unit 400 of the apparatus for adjusting the screen. Then, in operation 610, the scaler 420 converts the format of the input image into one suitable for the display panel (scaling). In operation 620, the user adjusts the screen state after selecting a screen adjustment mode through the OSD menu displayed on the display panel. In operation 630, an area of the screen is determined and the adjusted screen state is applied only to that area. The selected area of the screen is displayed based on an adjusted screen state, i.e., either the first screen state or the second screen state. The other area of the screen is displayed based on a reference screen state.

In addition to these operations, the user can select a desired screen state, i.e., either the adjusted screen state or the reference screen state while viewing the two different screen states of an image. Thus, the entire area of the screen can be displayed in the desired screen state.

Figure 7:
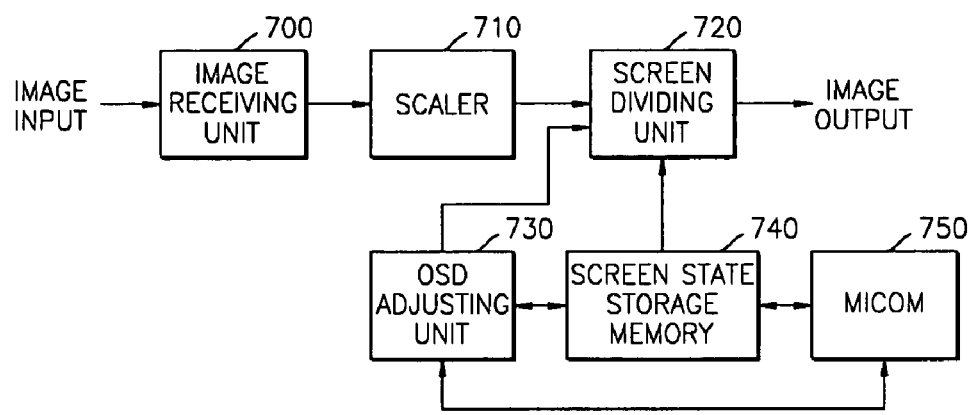
FIG. 7 illustrates an apparatus for adjusting a screen according to another embodiment of the present invention.

FIG. 7 illustrates an apparatus for adjusting a screen according to another embodiment of the present invention. The apparatus for adjusting the screen includes an image receiving unit 700, a scaler 710, a screen dividing unit 720, an OSD adjusting unit 730, a screen state storage memory 740, and a MICOM 750.

Operations and functions of the image receiving unit 700, the scaler 710, and the screen dividing unit 720 correspond to those of the apparatus for adjusting the screen as in FIG. 4 and will not be described again.

The OSD adjusting unit 730 functions as a user interface and provides the user with selectable screen states through an OSD menu. The plurality of screen states may include a first screen state, a second screen state, a third screen state, etc.

A plurality of screen adjustment parameters corresponding to the selectable screen states provided by the OSD adjusting unit 730 are produced and stored in the screen state storage memory 740.

The MICOM 750 controls the operation of each part of the apparatus for adjusting the screen of FIG. 7. In particular, regarding an operation of the screen adjustment, when the user selects one of the screen state values provided by the OSD adjusting unit 730, the MICOM 750 controls the screen state storage memory 740 such that the screen state storage memory 740 provides the screen dividing unit 720 with the screen adjustment parameters corresponding to the selected screen state values. Then the MICOM 750 controls the screen dividing unit 720 such that the screen dividing unit 720 displays an area of the screen based on the reference screen state and the other area of the screen based on an adjusted screen state by applying the screen adjustment parameters, which are received from the screen state storage memory 740.

Also, when the user selects a screen state through the OSD menu provided by the OSD adjusting unit 730 from the two different screen states of an image, the MICOM 750 can control the entire screen to be displayed based on the selected screen state.

Figure 2:
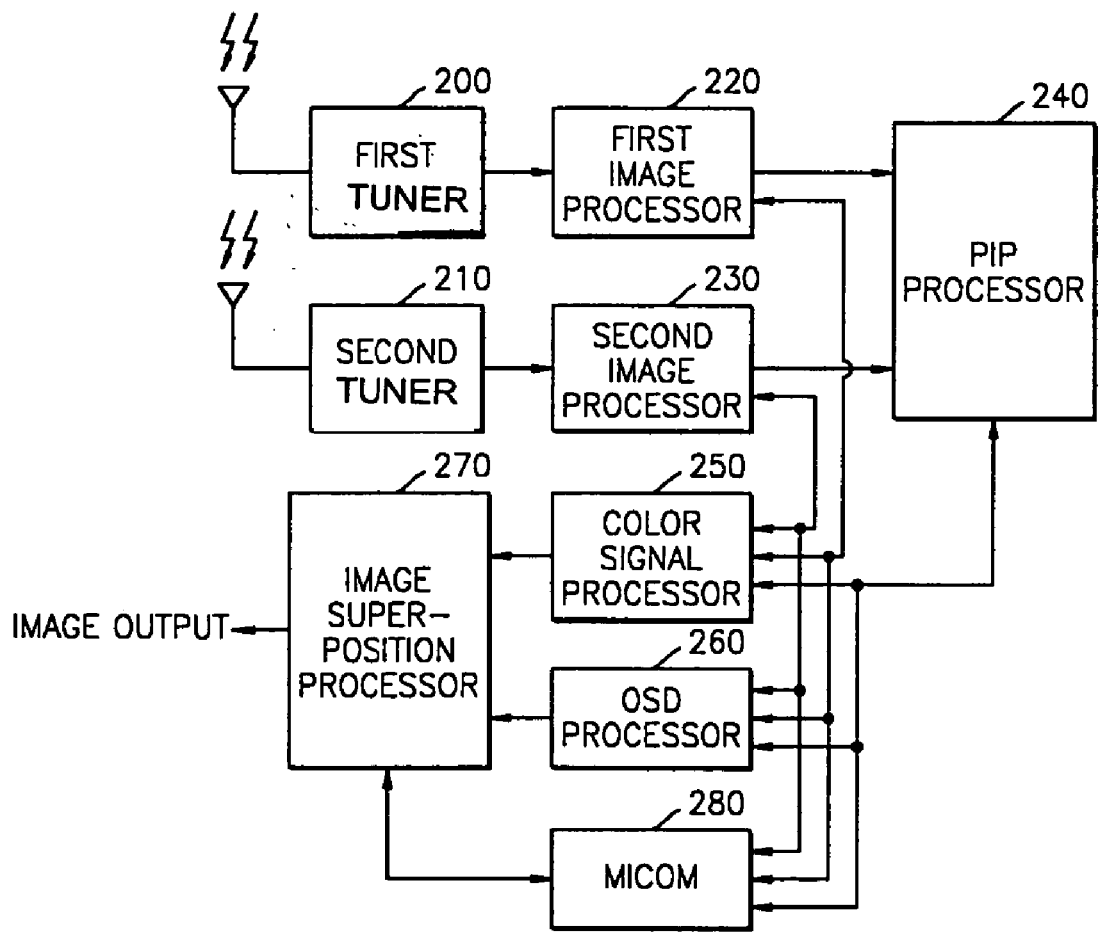
FIG. 2 is a schematic block diagram illustrating an image display device that allows the user to compare two states of the screen, before and after screen adjustment, according to the related art.
Figure 3:
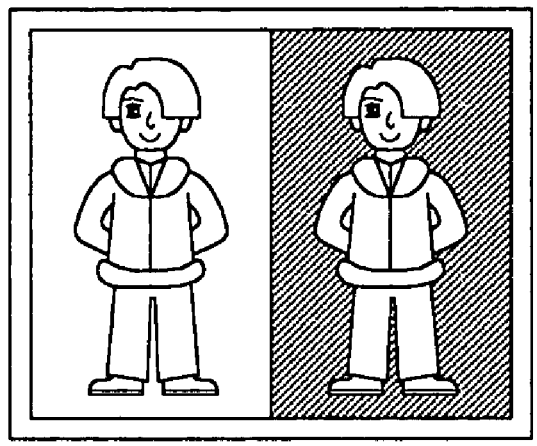
FIG. 3 illustrates a screen when a user is adjusting a screen by using the image display device of FIG. 2, according to the related art.

As compared to the related art of FIG. 2, the present invention differs at least in that the related art uses two tuners and two image processors to compare two states of the screen by including the same image in two frames, one of which is adjusted, and the other of which is not adjusted. In the present invention, the image is input to one image receiving unit, and different screen adjustment parameters are applied to different areas of the screen by using a screen dividing unit, such as an image dividing chip that can be easily obtained from common markets, and two states of the screen to which the different screen adjustment parameters are applied and displayed. As such, the present invention can be implemented by a simpler and/or less expensive configuration than the related art. In contrast to the related art in which two frames, including the same image are displayed in a PIP screen during screen adjustment, the present invention displays one image in two screen states, i.e., an adjusted screen state and a reference screen state. Therefore, the user can appreciate a reproduced image without interference or confusion.

According to the present invention, it is possible to provide a user with an apparatus for adjusting a screen having a simple configuration, and to enable the user to compare different screen states while watching one image on the screen, thereby allowing the user to appreciate a reproduced image without interference or confusion.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for adjusting a screen, the apparatus comprising:
    an on screen display adjusting unit, overlaid on an image to provide an interface to allow screen adjustment by a user; and
    a screen dividing unit to display an area of the screen with a portion of the image based on an adjusted screen state, adjusted using the on screen display adjusting unit, while displaying a remainder of the screen with the remaining portion of the same image based on an unadjusted reference screen state.

2. The apparatus of claim 1 further comprising a memory which stores a plurality of screen adjustment parameters corresponding to a plurality of selectable screen adjustment states, so that the screen dividing unit displays a selected screen adjustment state on an area of the screen while displaying a reference screen state on the remainder of the screen.

3. The apparatus of claim 2, wherein:
the on screen display adjusting unit shows the selectable screen adjustment states such as a first screen adjustment state and a second screen adjustment state to the user; and
the memory stores the screen adjustment parameters corresponding to each screen adjustment state.

4. The apparatus of claim 3, wherein, when the user selects one of the screen adjustment states through the on screen display adjusting unit, a screen adjustment parameter corresponding to the selected screen adjustment state is provided to the screen dividing unit from the memory, and the screen dividing unit changes the screen state of a predetermined area of the screen based on the screen adjustment parameter while the screen state of the other area of the screen remains unaffected.

5. An apparatus for adjusting a screen, the apparatus comprising:
an image receiving unit which receives an image to be reproduced;
a scaler which converts a format of the image received from the image receiving unit into a format suitable for display on the screen;
a screen dividing unit which, in a screen adjustment mode, divides the screen displaying the image having the converted format into two areas, one of which is displayed in a first screen state and the other of which is displayed in a second screen state on the screen;
an on screen display adjusting unit which provides an on screen display menu on the screen as an interface to allow screen adjustment by the user; and
a control unit which, when the user selects the screen adjustment mode through the on screen display adjusting unit, controls the screen dividing unit such that the screen dividing unit divides the screen displaying the image having the converted format into two areas, one of which is displayed as a first screen state and the other of which is displayed as a second screen state on the screen.

6. The apparatus of claim 5, wherein the first screen state is a predetermined reference screen state, and the second screen state is a screen adjustment state selected by the user through the on screen display adjusting unit.

7. The apparatus of claim 5, wherein the on screen display adjusting unit provides a user with a plurality of screen adjustment states such as a first screen adjustment state and a second screen adjustment state.

8. An apparatus for adjusting a screen, the apparatus comprising:
an image receiving unit which receives an image to be reproduced;
a scaler which converts a format of the image received from the image receiving unit into a format suitable for display on the screen;
a screen dividing unit which, in a screen adjustment mode, divides the screen including the image having the converted format into two areas, one of which is displayed in a first screen state and the other of which is displayed in a second screen state on the screen;
a memory which stores a plurality of screen adjustment parameters;
an on screen display adjusting unit which provides an on screen display menu, as an interface on the display panel, to a user to allow screen adjustment by the user; and a control unit which, when the user selects a screen adjustment mode through the on screen display adjusting unit, makes the memory provide the screen dividing unit with the screen adjustment parameter corresponding to the selected screen adjustment mode, and controls the screen dividing unit such that the screen dividing unit divides the screen including the image having the converted format into two areas, one of which is displayed as a first screen state and the other of which is displayed as a second screen state on the screen.

9. The apparatus of claim 8, wherein the first screen state is a reference screen state, and the second screen state is a screen adjustment state selected by the user through the on screen display adjusting unit.

10. The apparatus of claim 8, wherein the on screen display adjusting unit provides a user with a plurality of screen adjustment states such as a first screen adjustment state and a second screen adjustment state, and the memory stores a plurality of screen adjustment parameters corresponding to each screen adjustment state.

11. The apparatus of claim 10, wherein the control unit, when the user selects the screen adjustment mode through the on screen display provided by the on screen display adjusting unit, controls the memory such that the memory provides the screen adjustment parameters corresponding to the selected screen adjustment state to the screen dividing unit, and the screen dividing unit changes the screen state of a predetermined area of the screen based on the screen adjustment parameters while the remaining area of the screen is displayed in the reference screen state.

12. The apparatus of claim 11, wherein the control unit, when two states of the screen are displayed on the display panel and the user selects one of the two screen states through the on screen display menu provided by the on screen display adjusting unit, controls the entire area of the screen to be displayed in the selected screen state.

13. A method of adjusting a screen used in a device which displays an image on the screen, the method comprising:
receiving an image to be displayed;
providing a screen adjustment mode to a user;
adjusting the screen by the user; and
dividing the screen into two areas and displaying a part of the screen with a portion of the image in a screen adjustment state and the other part of the screen with the remaining portion of the same image in a reference screen state.

14. The method of claim 13, wherein providing the screen adjustment mode to the user is characterized by showing a plurality of selectable screen adjustment states, such as a first screen adjustment state and a second screen adjustment state, on an on screen display menu on the screen so as to allow the user to easily select one of the plurality of the screen adjustment states.

15. The method of claim 14, wherein the operation of adjusting of the screen by the user comprises the user selecting one of the plurality of the screen adjustment states.

16. A method of adjusting a screen used in a device reproducing an image, the method comprising:
receiving an image to be reproduced;
selecting the image by converting a format of the image into a format suitable for the screen;
allowing a user to select a screen adjustment mode provided by an on screen display menu to the user;
displaying a part of the screen with a portion of the selected image in a reference screen state and the other part of the screen with the remaining portion of the same selected image in a screen adjustment state;

allowing the user to select either the reference screen state or the screen adjustment state through the on screen display menu; and displaying the entire area of the screen in the selected screen state.

17. An apparatus for adjusting a screen including an image, the apparatus comprising:

an on screen display adjusting unit to allow a user to adjust a plurality of screen parameter values; and a screen dividing unit to divide the screen into a first section with a portion of the image and a second section with the remaining portion of the same image, wherein, the first section displays the screen in an unadjusted original state, and the second section displays the screen in an adjusted state according to the on screen display adjusting unit.

18. The apparatus for adjusting a screen according to claim 17, wherein the on screen display adjusting unit overlays a menu on the screen.

19. The apparatus for adjusting a screen according to claim 18, wherein the menu comprises a list of the plurality of screen parameter values.

20. The apparatus for adjusting a screen according to claim 17, wherein the first section displays the screen in a first adjusted state according to the on screen display adjusting unit, and the second section displays a second adjusted state according to the on screen display adjusting unit.

21. The apparatus for adjusting a screen according to claim 17, wherein the on screen display adjusting unit stores a plurality of predetermined adjusted screen states in a memory.

22. The apparatus for adjusting a screen according to claim 17, wherein the user is able to set the screen parameter values and store the screen parameter values in a memory as user defined adjusted screen states.

23. The apparatus for adjusting a screen according to claim 17, wherein either the first section or the second section is selectively displayed on the entire screen.

24. The apparatus for adjusting a screen according to claim 17, further comprising an image receiving unit which receives the image to be reproduced.

25. The apparatus for adjusting a screen according to claim 24, wherein the received image is received from among a plurality of broadcast signals.

26. The apparatus for adjusting a screen according to claim 24, wherein the received image is received from among a plurality of cable signals.

27. The apparatus for adjusting a screen according to claim 24, further comprising a scaler to convert a format of the received image into a format suitable for display.

* * * * *

UNITED STATES PATENT AND TRADEMARK OFFICE
CERTIFICATE OF CORRECTION

PATENT NO. : 7,428,018 B2 Page 1 of 1
APPLICATION NO. : 10/703080
DATED : September 23, 2008
INVENTOR(S) : Dae-Jung Kim et al.

It is certified that error appears in the above-identified patent and that said Letters Patent is hereby corrected as shown below:

First Page, Column 2 (U.S. Patent Documents), Line 2, change "348/58" to --348/588--.

Signed and Sealed this

Twenty-seventh Day of October, 2009

David J. Kappos
*Director of the United States Patent and Trademark Office*